United States Patent
Frederick et al.

(10) Patent No.: US 11,059,458 B2
(45) Date of Patent: Jul. 13, 2021

(54) SYSTEM AND METHOD FOR CLEANING OBSTRUCTIONS FOR THE SENSORS OF AN AUTONOMOUS VEHICLE

(71) Applicant: TOYOTA MOTOR ENGINEERING & MANUFACTURING NORTH AMERICA, INC., Plano, TX (US)

(72) Inventors: Scott L. Frederick, Brighton, MI (US); Scott P. Robison, Dexter, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 93 days.

(21) Appl. No.: 16/058,107

(22) Filed: Aug. 8, 2018

(65) Prior Publication Data
US 2020/0047717 A1    Feb. 13, 2020

(51) Int. Cl.
| | |
|---|---|
| *G01S 7/497* | (2006.01) |
| *B60S 1/56* | (2006.01) |
| *B60Q 9/00* | (2006.01) |
| *B60S 1/02* | (2006.01) |
| *G05D 1/00* | (2006.01) |

(52) U.S. Cl.
CPC ............ *B60S 1/56* (2013.01); *B60Q 9/00* (2013.01); *B60S 1/026* (2013.01); *G05D 1/0088* (2013.01)

(58) Field of Classification Search
None
See application file for complete search history.

(56) References Cited

U.S. PATENT DOCUMENTS

| | | |
|---|---|---|
| 6,175,335 B1 | 1/2001 | Ishikawa et al. |
| 6,414,623 B1 | 7/2002 | Ashihara |
| 6,630,901 B1 | 10/2003 | Winter et al. |
| (Continued) | | |

FOREIGN PATENT DOCUMENTS

| | | |
|---|---|---|
| EP | 2 045 870 A1 | 4/2009 |
| JP | 10-206521 | 8/1998 |
| (Continued) | | |

OTHER PUBLICATIONS

Olsen; Patrick, "How to Keep Your Car's Safety Sensors Clean When Show and Ice Attack", Dec. 13, 2017, Consumer Reports, https://www.consumerreports.org/car-safety/how-to-keep-your-car-sensors-clean-in-winter/, 5 pages. (Year: 2017).*

Primary Examiner — Redhwan K Mawari
Assistant Examiner — Melanie J Patrick
(74) Attorney, Agent, or Firm — Oblon, McClelland, Maier & Neustadt, L.L.P.

(57) ABSTRACT

The present disclosure relates to a method, a system, and a non-transitory computer readable medium for cleaning obstructions for the sensors of the autonomous vehicle. The method includes: detecting, via a sensor, obstructions that block the field of views for the sensors; retrieving real-time weather data outside the autonomous vehicle; estimating, based on the real-time weather data, the features of the obstructions; proposing, based on the estimation of the features of the obstructions and, one or more cleaning plans; querying, via a user interface, a selection by a user regarding the proposed cleaning plans; and executing, via a cleaning system for the sensors of the autonomous vehicle, the proposed cleaning plan selected by the user. User interaction may be vehicle-driven or user-driven.

17 Claims, 7 Drawing Sheets

(56) References Cited

U.S. PATENT DOCUMENTS

| | | | |
|---|---|---|---|
| 6,674,392 B1 | 1/2004 | Schmidt et al. | |
| 6,710,302 B1 | 3/2004 | Rennick | |
| 7,166,819 B2 | 1/2007 | Winter et al. | |
| 10,173,646 B1* | 1/2019 | Rice | B60S 1/56 |
| 2009/0045323 A1* | 2/2009 | Lu | B60Q 1/1423 |
| | | | 250/208.1 |
| 2012/0117745 A1* | 5/2012 | Hattori | B60S 1/0848 |
| | | | 15/250.01 |
| 2013/0262504 A1* | 10/2013 | Allgaier | G06N 5/04 |
| | | | 707/769 |
| 2015/0032292 A1* | 1/2015 | Stratton | B60S 1/62 |
| | | | 701/2 |
| 2015/0203076 A1* | 7/2015 | Irie | B60S 1/0848 |
| | | | 134/56 R |
| 2016/0041452 A1 | 2/2016 | Nomura et al. | |
| 2016/0176384 A1 | 6/2016 | Dissette et al. | |
| 2016/0364924 A1* | 12/2016 | Runde | A01B 69/00 |
| 2016/0375786 A1* | 12/2016 | Liu | B60W 10/26 |
| | | | 701/22 |
| 2017/0016643 A1* | 1/2017 | Combe | G05G 1/00 |
| 2018/0246323 A1* | 8/2018 | Fedigan | G02B 27/0006 |

FOREIGN PATENT DOCUMENTS

| | | |
|---|---|---|
| JP | 2006-3162 | 1/2006 |
| WO | 2017/097445 A1 | 6/2017 |

* cited by examiner

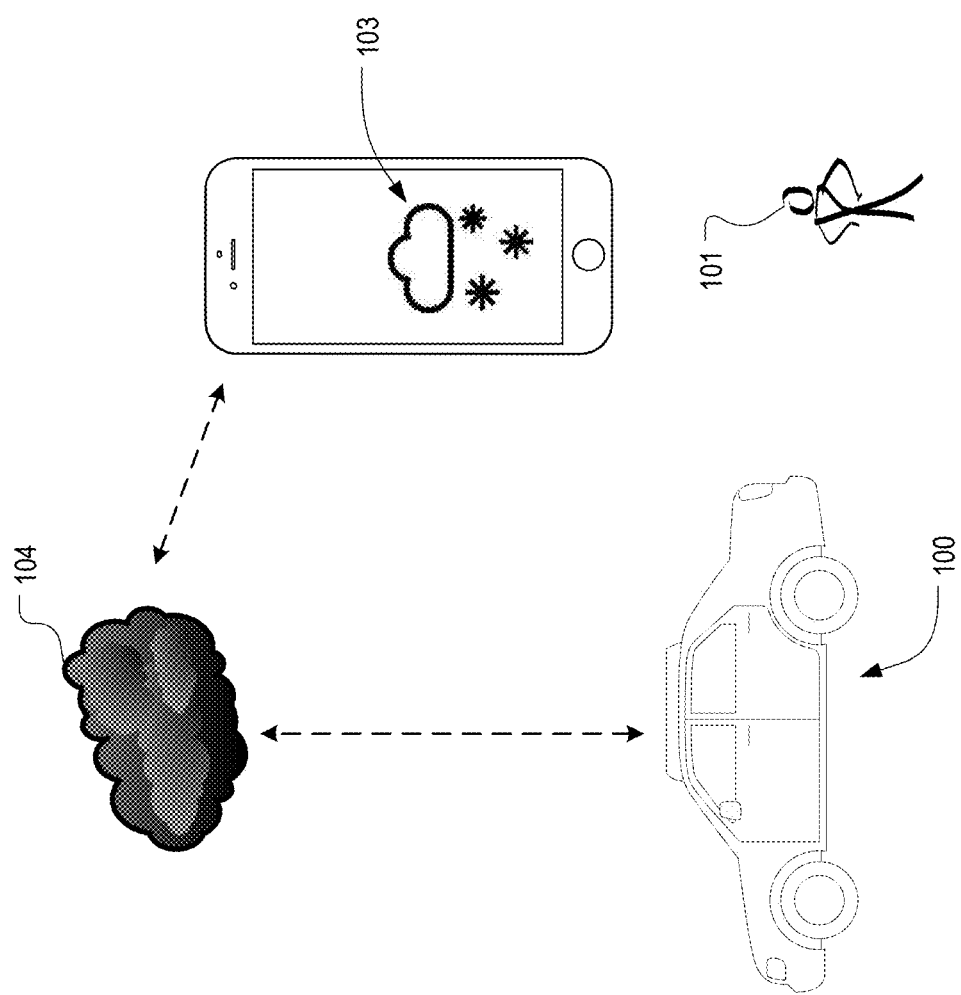

SYSTEM AND METHOD FOR CLEANING OBSTRUCTIONS FOR THE SENSORS OF AN AUTONOMOUS VEHICLE

BACKGROUND

Weather conditions such as ice, snow, and humidity can create problems for autonomous vehicles that rely on clear field of views in order to allow the electronics such as Lidar sensors, image sensors, and radar sensors to perform normal operation. Therefore, to provide clear field of views for these sensors in order to ensure their normal operation, a variety of methods and systems for cleaning obstructions have been proposed. U.S. Pat. No. 6,414,623 B1 entitled "Radar system mounted on vehicle and capable of detecting degradation of sensitivity" by Jun Ashihara describes a radar system mounted on a vehicle including a radar apparatus, a radome provided for the radar apparatus, a front wiper, a wiper operation detector detecting an operation of the front wiper, a temperature detector detecting temperature outside of the vehicle, and a processing unit. The processing unit estimates whether sensitivity degradation of the radar apparatus is caused based on the detecting result of the wiper operation detector and the detecting result of the temperature detector. However, an integrated platform where an autonomous vehicle renders a user a consultant has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to a method for cleaning obstructions for the sensors of an autonomous vehicle. The method detects, via a sensor, obstructions that block the field of views for the sensors. The method further retrieves real-time weather data outside the autonomous vehicle, and estimates the features of the obstructions based on the real-time weather data. Based on the estimation of the features of the obstructions, the method proposes, via the processing circuitry and, one or more cleaning plans. The method may propose a cleaning plan further based on a user suggestion and/or the weather forecast data. Then the method queries, via a user interface, a selection by a user regarding the proposed cleaning plans. Finally the method executes, via a cleaning system for the sensors of the autonomous vehicle, the proposed cleaning plan selected by the user.

The present disclosure further relates to system for cleaning obstructions for the sensors of an autonomous vehicle. The system comprises a sensor performing normal operation when its field of view is clear, a user interface, a cleaning system for the sensors of the autonomous vehicle, and a processing circuitry. The processing circuitry is configured to retrieve real-time weather data outside the autonomous vehicle, estimate the features of the obstructions, propose one or more cleaning plans, and execute the proposed cleaning plan selected by the user. The estimation of the features of the obstructions is based on the real-time weather data. The estimation of the features of the obstructions may be further based on the signal quality degradation level of the sensor. The proposed cleaning plans are based on the real-time weather data and the estimation of the features of the obstructions. The proposed cleaning plans may also be based on a user suggestion. The proposed cleaning plans may further be based on weather forecast data. The sensor is configured to detect obstructions that block its field of views. The user interface is configured to receive a user selection regarding the proposed cleaning plans in response to a query. The cleaning system is configured to clean the obstructions according to the instructions of the processing circuitry.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
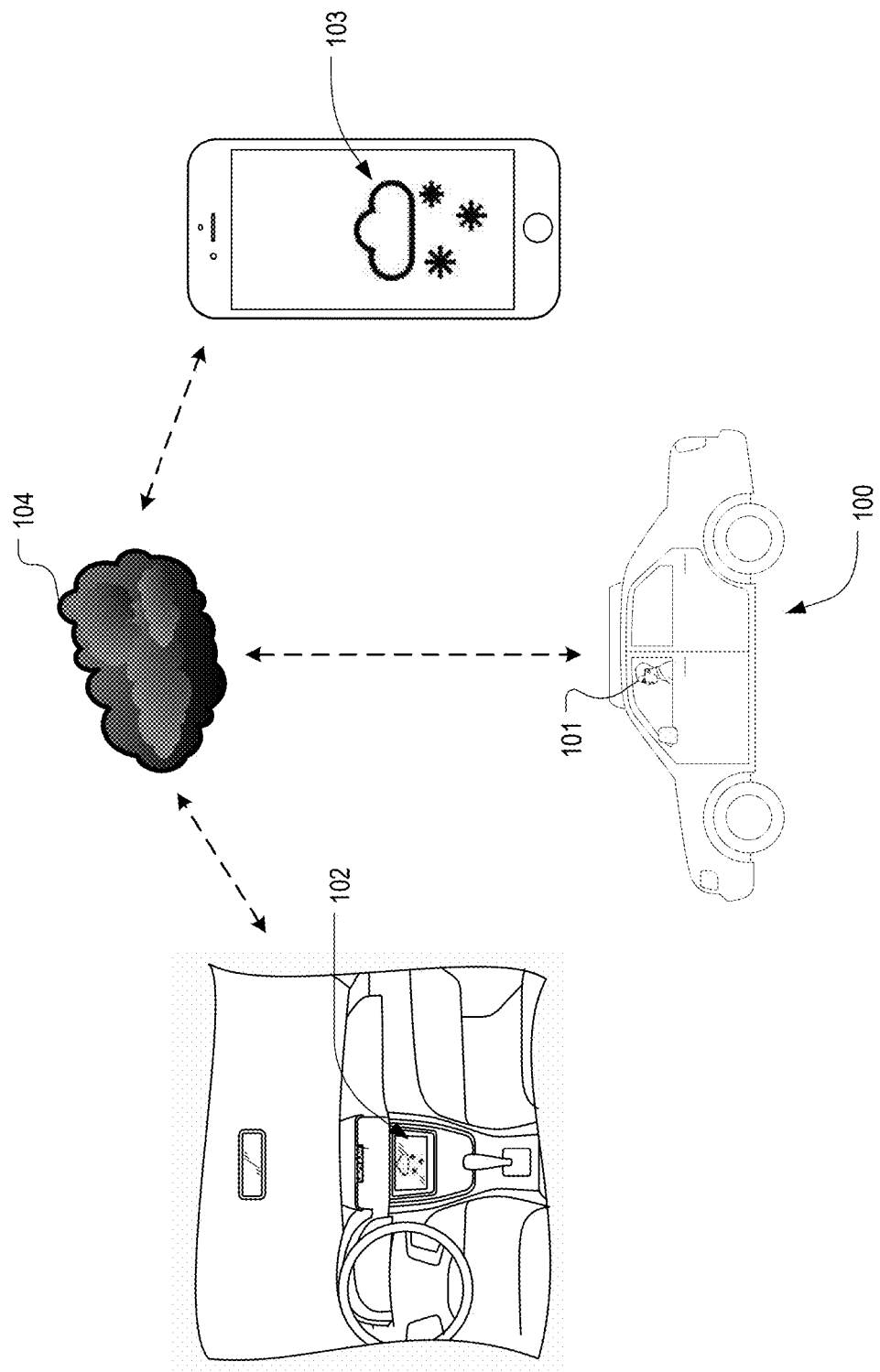
FIGS. 1 (A) and (B) are two exemplary scene diagrams that illustrate a user is inside and outside of an autonomous vehicle, respectively, according to certain embodiments of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a 4 combination of elements, functions, steps or acts are in some way inherently mutually exclusive.

An autonomous vehicle is equipped with various sensors including but not limited to temperature sensors, Lidar sensors, image sensors, and radar sensors, etc. Some of these sensors rely on clear field of views to perform normal operation, such as Lidar sensors, image sensors, and radar sensors, etc. The obstructions existing on the surfaces of the protective screens of these sensors may block the field of views of these sensors and degrade their normal operations. The present disclosure describes a system and method for cleaning obstructions for the sensors of autonomous vehicles that rely on clear field of views to perform normal operation prior to a trip and/or during a trip, no matter whether a user is inside the autonomous vehicles.

Referring now to the drawings, wherein like reference numerals designate identical or corresponding parts throughout several views, the following description relates to a system and associated methodology for cleaning obstructions for the sensors of an autonomous vehicle.

FIGS. 1 (A) and (B) are two exemplary scene diagrams that illustrate a user 101 is inside and outside of an autonomous vehicle (AV) 100 having a processing circuitry, respectively, according to certain embodiments of the present disclosure. Referring to FIG. 1 (A), when inside the AV 100, the user 101 can engage with the AV 100 via a vehicle-based user interface 102 or a user device-based user interface 103. Referring to FIG. 1 (B), when outside of the AV 100, the user 101 can engage with the AV 100 via a user device-based interface 103. In an embodiment, the vehicle-based user interface 102 may be a car infotainment system, and the user device-based user interface 103 may be a smartphone.

According to an embodiment, the user 101 may interact with the AV 100 via one or more interactions to initiate a cleaning program to clean obstructions and provide a clearer field of view for a sensor of the AV 100, no matter the AV 100 is prior a trip or during a trip.

In a first interaction, referred to as a vehicle-directed interaction, the AV 100 alerts the user 101 to initiate a cleaning program. In the vehicle-directed interaction, the processing circuitry of the AV 100 controls a sensor of the AV 100 that relies on a clear field of view to perform normal operation to continuously detect obstructions which block the field of view of the sensor.

In an embodiment, the obstructions detection can be performed by detecting the signal quality of a sensor that relies on a clear field of view to perform normal operation. If the signal quality of the sensor is below a pre-determined threshold, the processing circuitry of the AV 100 will determine that an obstruction exists. This pre-determined threshold is usually defined by the manufacturer and represents a signal quality degradation level below which the corresponding sensor of autonomous vehicle may not perform normal operation.

In an embodiment, the processing circuitry will alert the user 101 via a user interface to initiate a cleaning program if the existence of an obstruction is determined by the processing circuitry of the AV 100.

The processing circuitry of the AV 100 retrieves real-time weather data.

In an embodiment, the real-time weather data may be read by an outside temperature sensor of the AV 100, and/or retrieved from an online weather database 104 via wireless communication. The processing circuitry may send the location information of the AV 100, such as GPS information, zip code, etc., to the online weather database 104 via wireless communication, and then receive, via wireless communication and form the online weather database 104, the real-time weather data of the location area of the AV 100.

Based on the collected real-time weather data and/or the obstructions detection data such as signal quality degradation level, the processing circuitry estimates the features of the obstructions, such as precipitation property, accumulation size and depth, etc.

In an embodiment, the real-time weather data retrieved from the online weather database 104 may indicate that the current air temperature is −10° in the location of the AV 100. The real-time weather data retrieved from the online weather database 104 may also indicate that it is snowing and the accumulation of the snow may be about 1 inch in the location area of the AV 100. In addition, the real-time weather data read from the outside temperature sensor of the AV 100 may indicate the current temperature outside of the AV 100 is −10°. Based on the collected weather data, the processing circuitry can estimate the obstructions accumulated on the surfaces of the protective screens of the sensors of the AV 100 may be snow and the current accumulation of the snow may be about 1 inch.

In an embodiment, the real-time weather data retrieved from the online weather database 104 may indicate that the current air temperature is −10° and it is snowing in the location of the AV 100. The sensor may indicate that the present signal quality level may be half of the normal level. Based on the real-time weather data, the processing circuitry can estimate the obstructions accumulated on the surfaces of the protective screens of the sensors of the AV 100 may be snow. The signal quality degradation level may be mapped to an accumulation of the snow. Based on the signal quality degradation level, the processing circuitry can estimate the current accumulation of the snow may be 1 inch.

In an embodiment, based on the estimated features of the obstructions and the real-time weather data, the processing circuitry proposes a cleaning plan which may include but not limited to cleaning time, necessity to activate heating and/or blow hot air.

In an embodiment, except the current weather data, the online weather database 104 may provide weather forecast data, such as the forecasted stopping time of the snow, the forecasted accumulation of the snow in next hour, etc. Thus, a cleaning plan may be proposed based on the estimated features of the obstructions and the weather forecast data.

If the user 101 approves the proposed cleaning plan, the processing circuitry will control a cleaning system to execute the proposed cleaning plan. If the user 101 rejects the proposed cleaning plan but still needs to clean the obstructions, the processing circuitry will propose another cleaning plan based on a suggestion provided by the user 101, such as less cleaning time, no heating, etc. If the user 101 indicates that another cleaning plan is not needed, the processing circuitry will end the cleaning program.

In a second interaction, referred to as a user-directed interaction, the user 101 requests the AV 100 to initiate a cleaning program. In the user-direct interaction, the processing circuitry of the AV 100 responds to the user request. Upon receiving the request sent from the user 101, the processing circuitry controls a sensor of the AV 100 that relies on a clear field of view to perform normal operation to detect obstructions which block the field of view of the sensor.

The processing circuitry of the AV 100 retrieves real-time weather data.

In an embodiment, the real-time weather data may be read by an outside temperature sensor of the AV 100, and/or retrieved from an online weather database 104 via wireless communication. The processing circuitry may send the location information of the AV 100, such as GPS information, zip code, etc., to the online weather database 104 via wireless communication, and then receive, via wireless communication and form the online weather database 104, the real-time weather data of the location area of the AV 100.

Based on the collected real-time weather data and/or the obstructions detection data such as signal quality degradation level, the processing circuitry estimates the features of the obstructions, such as precipitation property, accumulation size and depth, etc.

In an embodiment, the real-time weather data retrieved from the online weather database 104 may indicate that the current air temperature is −10° in the location of the AV 100. The real-time weather data retrieved from the online weather database 104 may also indicate that it is snowing and the accumulation of the snow may be about 1 inch in the location area of the AV 100. In addition, the real-time weather data read from the outside temperature sensor of the AV 100 may indicate the current temperature outside of the AV 100 is −10°. Based on the collected weather data, the processing circuitry can estimate the obstructions accumulated on the surfaces of the protective screens of the sensors of the AV 100 may be snow and the current accumulation of the snow may be about 1 inch.

In an embodiment, the real-time weather data retrieved from the online weather database 104 may indicate that the current air temperature is −10° and it is snowing in the location of the AV 100. The sensor may indicate that the present signal quality level may be half of the normal level. Based on the real-time weather data, the processing circuitry can estimate the obstructions accumulated on the surfaces of the protective screens of the sensors of the AV 100 may be snow. The signal quality degradation level may be mapped to an accumulation of the snow. Based on the signal quality degradation level, the processing circuitry can estimate the current accumulation of the snow may be 1 inch.

In an embodiment, based on the estimated features of the obstructions and the real-time weather data, the processing circuitry proposes a cleaning plan which may include but not limited to cleaning time, necessity to activate heating and/or blow hot air.

In an embodiment, except the current weather data, the online weather database 104 may provide weather forecast data, such as the forecasted stopping time of the snow, the forecasted accumulation of the snow in next hour, etc. Thus, a cleaning plan may be proposed based on the estimated features of the obstructions and the weather forecast data.

If the user 101 approves the proposed cleaning plan, the processing circuitry will control a cleaning system to execute the proposed cleaning plan. If the user 101 rejects the proposed cleaning plan but still needs to clean the obstructions, the processing circuitry will propose another cleaning plan based on a suggestion provided by the user 101, such as less cleaning time, no heating, etc. If the user 101 indicates that another cleaning plan is not needed, the processing circuitry will end the cleaning program.

It is noted that the user 101 may interact with the AV 100 via a user interface no matter the interaction between the user 101 and AV 100 is vehicle-directed or user-directed. The user interfaces can be a vehicle-based user interface 102 and/or a user device-based user interface 103. The vehicle-based user interface 102 includes but not limited to a car infotainment system, and the user device-based user interface 103 includes but not limited to a smartphone, a tablet, a wearable device, or a PDA, etc.

The interaction between the user 101 and the AV 100 can be conducted no matter the AV 100 is prior a trip or during a trip. The interaction between the user 101 and the AV 100 can also be conducted no matter the AV 100 is in stop mode, idle mode, or driving mode.

Figure 2:
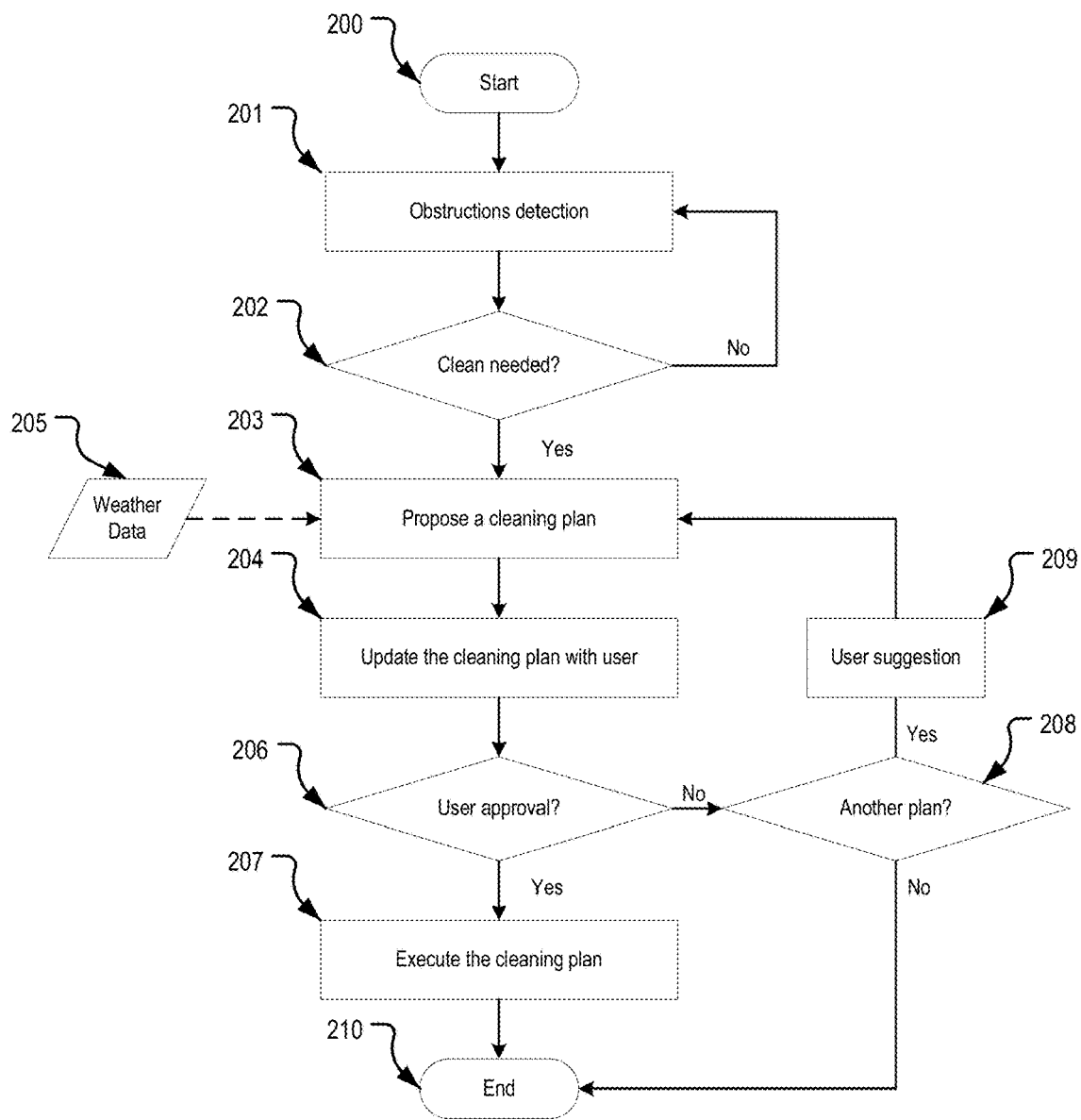
FIG. 2 is a flowchart of a vehicle-directed interaction between a user and an autonomous vehicle, according to an exemplary embodiment of the present disclosure.

FIG. 2 is a flowchart of a vehicle-directed interaction between a user and an autonomous vehicle, according to an exemplary embodiment of the present disclosure. Prior to a trip and/or during a trip, an AV continuously detects obstructions, no matter whether a user is inside the AV. The obstructions include but not limited to snow, ice, fog, and condensation, etc. Actually anything affecting the signal quality of the sensors of the AV that use clear field of views for normal operation can be identified as obstructions.

In an embodiment, a pre-determined signal quality degradation level is usually defined as the signal quality threshold of a sensor below which the field of view of the sensor is affected and the normal operation of the sensor is not guaranteed. Once the signal quality of the sensor is below its pre-determined signal quality threshold, a cleaning program will be initiated and the processing circuitry will propose a cleaning plan based on the collected real-time weather data and the estimated features of the obstructions. Following approval of the proposed cleaning plan, a cleaning system will clean the obstructions according to the proposed cleaning plan.

This high-level description of a vehicle-directed interaction between a user and an autonomous vehicle is described in detail in the flowchart of FIG. 2.

According to an exemplary embodiment of the present disclosure, following a procedure start 200, continuous obstructions detection 201 is conducted. It is noted that the obstructions detection may occur continuously, at discrete intervals (i.e., 1 second, 10 seconds, 30 seconds, 60 seconds, 120 seconds, etc.). The obstructions detection is performed by a variety of approaches including but not limited to a comparison between the present signal quality and a pre-determined signal quality threshold. Whether a cleaning program is needed is determined by the result of the obstructions detection 202.

In an embodiment, if it is determined that the present signal quality is above the pre-determined threshold, a cleaning program won't be initiated and the procedure returns to obstructions detection 201. If it is determined that the present signal quality is below the pre-determined threshold, a cleaning plan will be proposed 203 and updated 204 with the user via a user interface.

In an embodiment, the proposed cleaning plan may be based on the real-time weather data 205 retrieved from an online weather database and the outside temperature read by an outside temperature sensor of the AV. The proposed cleaning plan may be also based on the estimated features of the obstruction. The proposed cleaning plan may further be based on the weather forecast data retrieved from an online weather database.

Approval of the proposed cleaning plan is determined by the user 206. If the proposed cleaning plan is approved by the user, the processing circuitry will control a cleaning system to execute the proposed cleaning plan 207. Upon completing the proposed cleaning plan, the processing circuitry will end the procedure 210. If the user rejects the proposed cleaning, the user will be asked, via a user interface, that if another cleaning plan is needed 208. If the user indicates via a user interface that another cleaning plan is not needed, the processing circuitry will end the procedure 210. If the user indicates via a user interface that another cleaning plan is needed, the user will have the option to input suggestions and/or modify the proposed cleaning plan via a user interface 209. After the user's input is completed, the processing circuitry will propose another cleaning plan 203 based on the user suggestion 209, the real-time weather data 205, and the estimated features of the obstructions.

Figure 3:
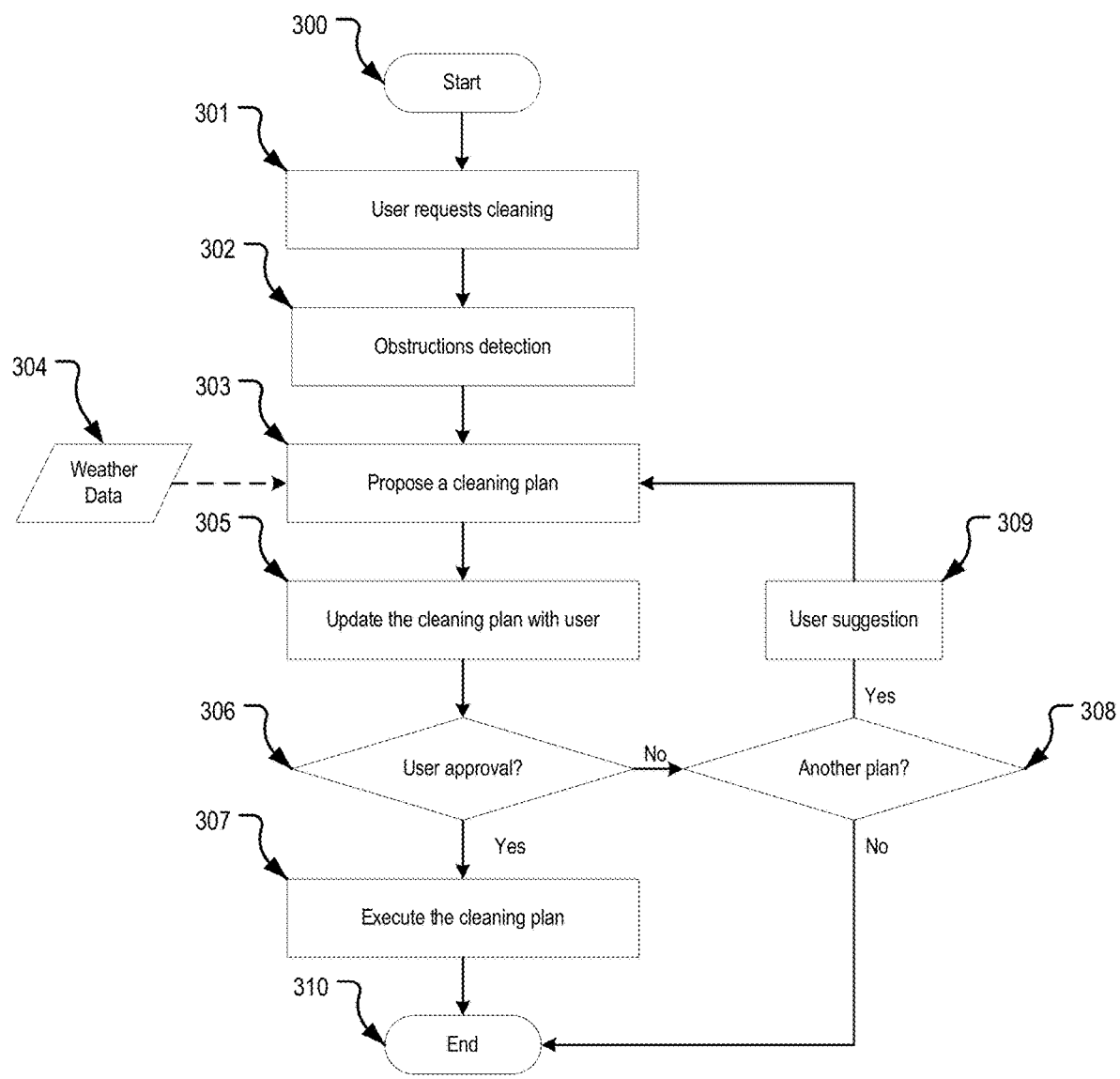
FIG. 3 is a flowchart of a user-directed interaction between a user and an autonomous vehicle, according to an exemplary embodiment of the present disclosure.

FIG. 3 is a flowchart of a user-directed interaction between a user and an autonomous vehicle, according to an exemplary embodiment of the present disclosure. Prior a trip and/or during a trip, a user requests an AV to perform a cleaning program, no matter whether the user is inside the AV. At the user's request, the processing circuitry of the AV begins obstructions detection, retrieving real-time weather data, and estimates the features of the obstructions based to the real-time weather data. Then the processing circuitry proposes a cleaning plan based on the collected real-time weather data and the estimated features of the obstructions. Following approval of the proposed cleaning plan, a cleaning system will clean the obstructions according to the proposed cleaning plan.

This high-level description of a user-directed interaction between a user and an autonomous vehicle is described in detail in the flowchart of FIG. 3.

According to an exemplary embodiment of the present disclosure, following a procedure start 300, a user requests the AV via a user interface to initiate a cleaning program for the sensors of the AV that use clear field of views to perform normal operation 301. Upon receiving the user's request, the processing circuitry of the AV controls a sensor to conduct obstructions detection 302. The obstructions detection is performed by a variety of approaches including but not limited to a comparison between the present signal quality and a pre-determined signal quality threshold.

Then a feature estimation of the obstruction is conducted based on the real-time weather data 304 and a cleaning plan is proposed 303 based on the feature estimation of the obstruction and real-time weather data 304.

In an embodiment, the proposed cleaning plan may be based on the real-time weather data 304 retrieved from an online weather database and the outside temperature read by an outside temperature sensor of the AV. The proposed cleaning plan may be also based on the estimated features of the obstruction. The proposed cleaning plan may further be based on the weather forecast data retrieved from an online weather database.

Then the processing circuitry will update the proposed cleaning plan with the user via a user interface 305.

Approval of the proposed cleaning plan is determined by the user 306. If the proposed cleaning plan is approved by the user, the processing circuitry will control a cleaning system to execute the proposed cleaning plan 307. Upon completing the proposed cleaning plan, the processing circuitry will end the procedure 310. If the user rejects the proposed cleaning, the user will be asked, via a user interface, that if another cleaning plan is needed 308. If the user indicates via a user interface that another cleaning plan is not needed, the processing circuitry will end the procedure 310. If the user indicates via a user interface that another cleaning plan is needed, the user will have the option to input suggestions and/or modify the proposed cleaning plan via a user interface 309. After the user's input is completed, the processing circuitry will propose another cleaning plan 303 based on the user suggestion 309, the real-time weather data 304, and the estimated features of the obstructions.

Figure 4:
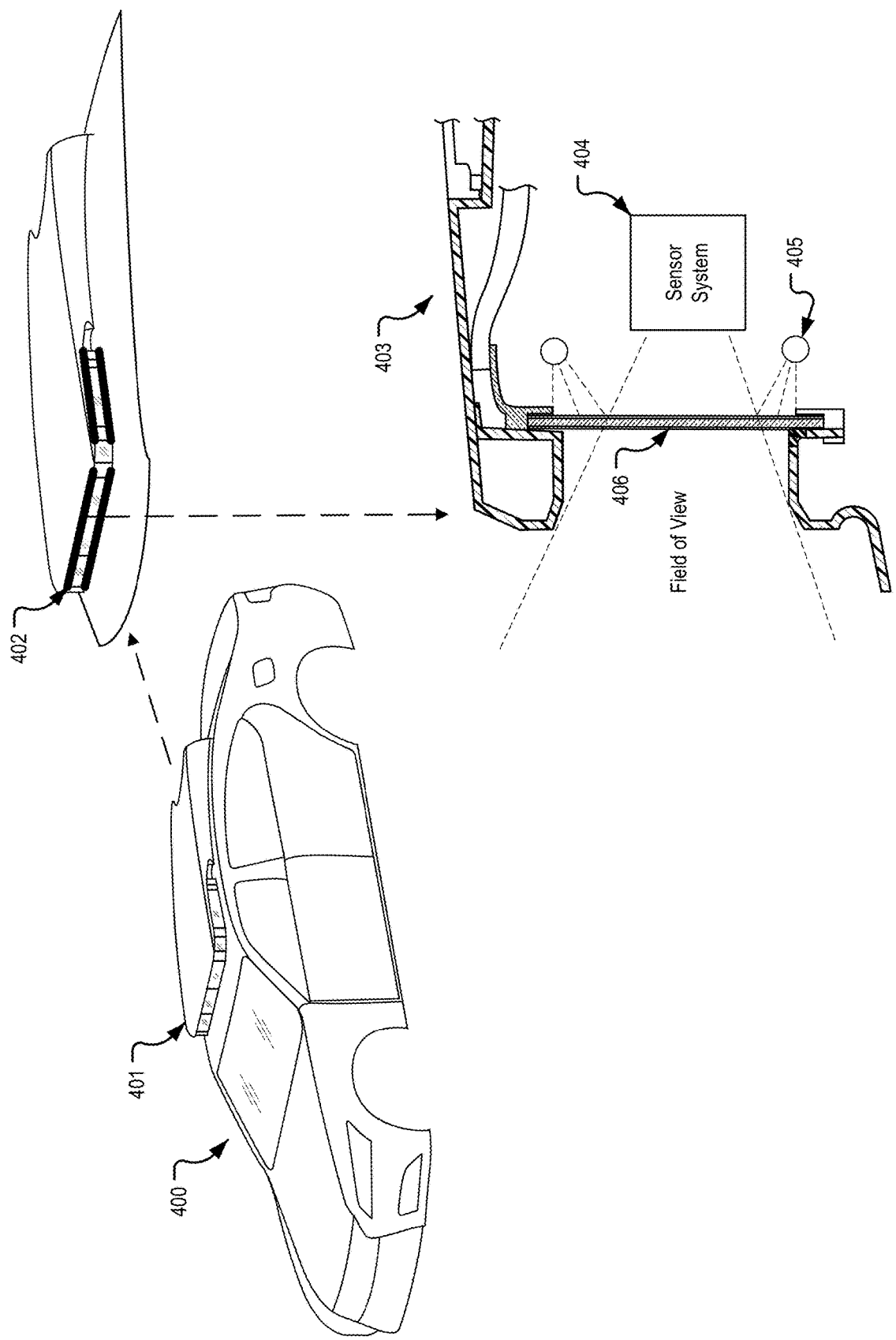
FIG. 4 is a schematic illustration of an autonomous vehicle having a cleaning system for the sensors that use clear field of views to perform normal operation, according to an exemplary embodiment of the present disclosure.

FIG. 4 is a schematic illustration of an autonomous vehicle 400 having a cleaning system for the sensors that use clear field of views to perform normal operation, according to an exemplary embodiment of the present disclosure. In this embodiment, a sensor system 404 is located in a roof cover 401 of the AV 400. In an embodiment, a sensor system may be located in different place, such as the front part of an AV or the rear part of the AV. The sensor system 404 includes but not limited to Lidar sensor, image sensor, and radar sensor, etc. In order to perform normal operation, the sensor system 404 uses clear field of view in 360°. Therefore, a cleaning system is located near the sensor system 404 to remove possible obstructions that block field of views of the sensor system 404. In this embodiment, heating wires and hot air are used in the cleaning system for the sensor system 404. The heating wires 402 are modeled within the roof cover 401 to keep the resin material at high enough temperature to prevent snow and ice from accumulating outside of the protective screen of the sensor and blocking the field of view of the sensor. In addition, the heating wires 402 can also be used to eliminate fogging or condensation on the protective screen 406. The hot air is supplied by the HVAC of the AV 400 via hollow defroster bars 405 near the protective screen 406, as shown in the cross section of the roof cover 403. The hollow defroster bars 405 can have vent holes throughout to supply air to the protective screen 406. Since the sensor system 404 uses clear field of view in 360°, the heating wires 402 and the defroster bars 405 can be provided to all locations around the sensor system 404. The logic for the system to activate heating come from two sources: an obstruction detected and a cold temperature retrieved. This will prevent heating due to dirt, mud, and bugs, etc. In an embodiment, when the processing circuitry of the AV determines an obstruction detected and the outside temperature is below 0°, the proposed cleaning plan will include activating heating.

Figure 5:
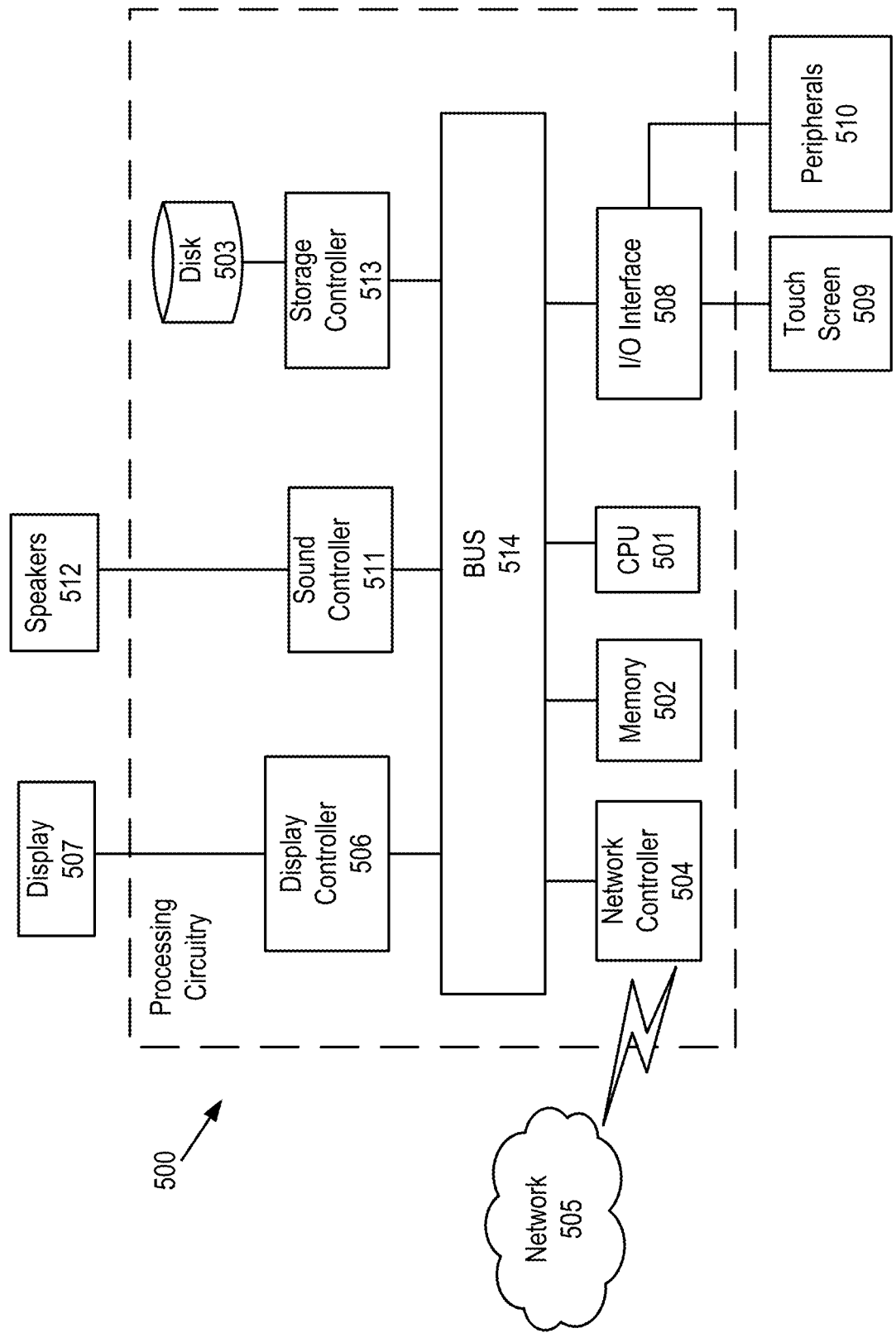
FIG. 5 is a schematic of hardware of a processing circuitry of an autonomous vehicle, according to an exemplary embodiment of the present disclosure.

FIG. 5 is a hardware description of a processing circuitry 500 according to certain exemplary embodiments of the present disclosure. In FIG. 5, the processing circuitry 500 includes a CPU 501 which performs the processes described above/below. The process data and instructions may be stored in memory 502. These processes and instructions may also be stored on a storage medium disk 503 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 500 communicates, such as a server or computer.

Further, the claimed advancements may be provided as a utility application, background daemon, or component of an operating system, or combination thereof, executing in conjunction with CPU 501 and an operating system such as Microsoft Windows 7, UNIX, Solaris, LINUX, Apple MAC-OS and other systems known to those skilled in the art.

The hardware elements in order to achieve the processing circuitry 500 may be realized by various circuitry elements, known to those skilled in the art. For example, CPU 501 may be a Xenon or Core processor from Intel of America or an Opteron processor from AMD of America, or may be other processor types that would be recognized by one of ordinary skill in the art. Alternatively, the CPU 501 may be implemented on an FPGA, ASIC, PLD or using discrete logic circuits, as one of ordinary skill in the art would recognize. Further, CPU 501 may be implemented as multiple processors cooperatively working in parallel to perform the instructions of the inventive processes described above.

The processing circuitry 500 in FIG. 5 also includes a network controller 504, such as an Intel Ethernet PRO network interface card from Intel Corporation of America, for interfacing with network 505. As can be appreciated, the network 505 can be a public network, such as the Internet, or a private network such as an LAN or WAN network, or any combination thereof and can also include PSTN or ISDN sub-networks. The network 505 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The processing circuitry 500 further includes a display controller 506, such as a NVIDIA GeForce GTX or Quadro graphics adaptor from NVIDIA Corporation of America for interfacing with display 507, such as a Hewlett Packard HPL2445w LCD monitor. A general purpose I/O interface 508 interfaces with a touch screen panel 509 on or separate from display 507. General purpose I/O interface also connects to a variety of peripherals 510.

A sound controller 511 is also provided in the processing circuitry 500, such as Sound Blaster X-Fi Titanium from Creative, to interface with speakers/microphone 512 thereby providing sounds and/or music.

The general purpose storage controller 513 connects the storage medium disk 503 with communication bus 514, which may be an ISA, EISA, VESA, PCI, or similar, for interconnecting all of the components of the processing circuitry 500. A description of the general features and functionality of the display 507 as well as the display controller 506, storage controller 513, network controller 504, sound controller 511, and general purpose I/O interface 508 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Figure 6:
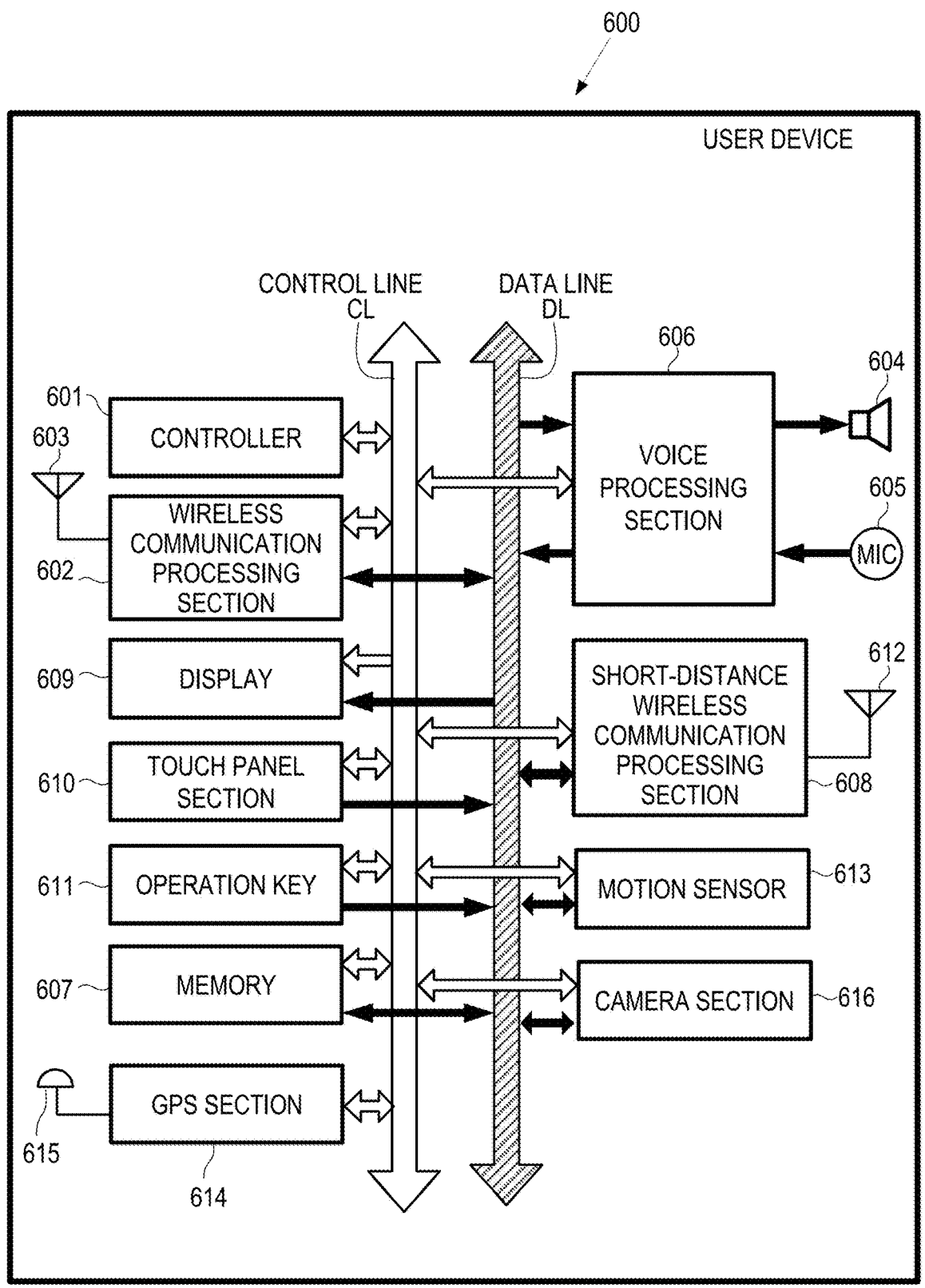
FIG. 6 is a schematic of hardware of a user device, according to an exemplary embodiment of the present disclosure.

FIG. 6 is a more detailed block diagram illustrating an exemplary user device 600 according to certain embodiments of the present disclosure. In certain embodiments, the exemplary user device 600 may be a smartphone. However, the skilled artisan will appreciate that the features described herein may be adapted to be implemented on other devices (e.g., a laptop, a tablet, a server, an e-reader, a camera, a navigation device, etc.). The exemplary user device 600 of FIG. 6 includes a controller 601 and a wireless communication processor 602 connected to an antenna 603. A speaker 604 and a microphone 605 are connected to a voice processor 606.

The controller 601 is an example of a control unit and may include one or more Central Processing Units (CPUs), each controlling each element in the user device 600 to perform functions related to communication control, audio signal processing, control for the audio signal processing, still and moving image processing and control, and other kinds of signal processing. The controller 601 may perform these functions by executing instructions stored in a memory 607. Alternatively or in addition to the local storage of the memory 607, the functions may be executed using instructions stored on an external device accessed on a network or on a non-transitory computer readable medium.

The memory 607 is an example of a storage unit and includes but is not limited to Read Only Memory (ROM), Random Access Memory (RAM), or a memory array including a combination of volatile and non-volatile memory units. The memory 607 may be utilized as working memory by the controller 601 while executing the processes and algorithms of the present disclosure. Additionally, the memory 607 may be used for long-term storage, e.g., of image data and information related thereto.

The user device 600 includes a control line CL and data line DL as internal communication bus lines. Control data to/from the controller 601 may be transmitted through the control line CL. The data line DL may be used for transmission of voice data, display data, etc.

The antenna 603 transmits/receives electromagnetic wave signals between base stations for performing radio-based communication, such as the various forms of cellular telephone communication. The wireless communication processor 602 controls the communication performed between the user device 600 and other external devices via the antenna 603. For example, the wireless communication processor 602 may control communication between base stations for cellular phone communication.

The speaker 604 emits an audio signal corresponding to audio data supplied from the voice processor 606. The microphone 605 detects surrounding audio and converts the detected audio into an audio signal. The audio signal may then be output to the voice processor 606 for further processing. The voice processor 606 demodulates and/or decodes the audio data read from the memory 607 or audio data received by the wireless communication processor 602 and/or a short-distance wireless communication processor 608. Additionally, the voice processor 606 may decode audio signals obtained by the microphone 605.

The exemplary user device 600 may also include a display 609, a touch panel 610, an operation key 611, and a short-distance communication processor 608 connected to an antenna 612. The display 609 may be a Liquid Crystal Display (LCD), an organic electroluminescence display panel, or another display screen technology. In addition to displaying still and moving image data, the display 609 may display operational inputs, such as numbers or icons which may be used for control of the user device 600. The display 609 may additionally display a GUI for a user to control aspects of the user device 600 and/or other devices. Further, the display 609 may display characters and images received by the user device 600 and/or stored in the memory 607 or accessed from an external device on a network. For example, the user device 600 may access a network such as the Internet and display text and/or images transmitted from a Web server.

The touch panel 610 may include a physical touch panel display screen and a touch panel driver. The touch panel 610 may include one or more touch sensors for detecting an input operation on an operation surface of the touch panel display screen. The touch panel 610 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 610 may detect when the stylus approaches/contacts the operation surface of the touch panel display (similar to the case in which a finger is used for the touch operation).

In certain aspects of the present disclosure, the touch panel 610 may be disposed adjacent to the display 609 (e.g., laminated) or may be formed integrally with the display 609. For simplicity, the present disclosure assumes the touch panel 610 is formed integrally with the display 609 and therefore, examples discussed herein may describe touch operations being performed on the surface of the display 609 rather than the touch panel 610. However, the skilled artisan will appreciate that this is not limiting.

For simplicity, the present disclosure assumes the touch panel 610 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 610 may include transparent electrode touch sensors arranged in the X-Y direction on the surface of transparent sensor glass.

The touch panel driver may be included in the touch panel 610 for control processing related to the touch panel 610, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 610 may detect a position of a user's finger around an edge of the display panel 609 (e.g., gripping a protective case that surrounds the display/touch panel). Signals may be transmitted by the touch panel driver, e.g. in response to a detection of a touch operation, in response to a query from another element based on timed data exchange, etc.

The touch panel 610 and the display 609 may be surrounded by a protective casing, which may also enclose the other elements included in the user device 600. In certain embodiments, a position of the user's fingers on the protective casing (but not directly on the surface of the display 609) may be detected by the touch panel 610 sensors. Accordingly, the controller 601 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 601 may be configured to detect which hand is holding the user device 600, based on the detected finger position. For example, the touch panel 610 sensors may detect a plurality of fingers on the left side of the user device 600 (e.g., on an edge of the display 609 or on the protective casing), and detect a single finger on the right side of the user device 600. In this exemplary scenario, the controller 601 may determine that the user is holding the user device 600 with his/her right hand because the detected grip pattern corresponds to an expected pattern when the user device 600 is held only with the right hand.

The operation key 611 may include one or more buttons or similar external control elements, which may generate an operation signal based on a detected input by the user. In addition to outputs from the touch panel 610, these operation signals may be supplied to the controller 601 for performing related processing and control. In certain aspects of the present disclosure, the processing and/or functions associated with external buttons and the like may be performed by the controller 601 in response to an input operation on the touch panel 610 display screen rather than the external button, key, etc. In this way, external buttons on the user device 600 may be eliminated in lieu of performing inputs via touch operations, thereby improving water-tightness.

The antenna 612 may transmit/receive electromagnetic wave signals to/from other external apparatuses, and the short-distance wireless communication processor 608 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 608.

The user device 600 may include a motion sensor 613. The motion sensor 613 may detect features of motion (i.e., one or more movements) of the user device 600. For example, the motion sensor 613 may include an accelerometer to detect acceleration, a gyroscope to detect angular velocity, a geomagnetic sensor to detect direction, a geo-location sensor to detect location, etc., or a combination thereof to detect motion of the user device 600. In certain embodiments, the motion sensor 613 may generate a detection signal that includes data representing the detected motion. For example, the motion sensor 613 may determine a number of distinct movements in a motion (e.g., from start of the series of movements to the stop, within a predetermined time interval, etc.), a number of physical shocks on the user device 600 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 601, whereby further processing may be performed based on data included in the detection signal. The motion sensor 613 can work in conjunction with a Global Positioning System (GPS) section 614. The GPS section 614 detects the present position of the user device 600. The information of the present position detected by the GPS section 614 is transmitted to the controller 601. An antenna 615 is connected to the GPS section 614 for receiving and transmitting signals to and from a GPS satellite.

The user device 600 may include a camera section 616, which includes a lens and shutter for capturing photographs of the surroundings around the user device 600. In an embodiment, the camera section 616 captures surroundings of an opposite side of the user device 600 from the user. The images of the captured photographs can be displayed on the display panel 609. A memory section saves the captured photographs. The memory section may reside within the camera section 616 or it may be part of the memory 607. The camera section 616 can be a separate feature attached to the user device 600 or it can be a built-in camera feature.

Obviously, numerous modifications and variations are possible in light of the above teachings. It is therefore to be understood that within the scope of the appended claims, the disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for cleaning obstructions for at least one sensor of an autonomous vehicle, comprising:
    detecting obstructions that block a field of view of the at least one sensor;
    retrieving, by a processing circuitry of the autonomous vehicle, real-time weather data of an environment outside of the autonomous vehicle;
    estimating, by the processing circuitry, features of the obstructions, based on the real-time weather data;
    proposing, by the processing circuitry, one or more cleaning plans to a user, based on the estimation of the features of the obstructions, such that the one or more cleaning plans are displayed on a user interface;
    querying, via a user interface, a selection of a selected cleaning plan by the user from the one or more leaning plans;
    in response to the user selecting one of the one or more cleaning plans that are queried via the user interface, executing by the processing circuitry and via a cleaning system for the at least one sensor of the autonomous vehicle, the selected cleaning plan selected by the user;
    in response to the user not selecting one of the one or more cleaning plans that are queried via the user interface, soliciting via the user interface a user suggestion for another cleaning plan, adjusting, by the processing circuitry, the one or more cleaning plans based on the user suggestion, and executing, by the processing circuitry and via the cleaning system for the at least one sensor of the autonomous vehicle, the another cleaning plan suggested by the user.

2. The method according to claim 1, wherein the detecting of the obstructions comprises a comparison between a signal quality of the sensor and a pre-determined threshold.

3. The method according to claim 1, wherein the real-time weather data includes data read from a temperature sensor of the autonomous vehicle and/or data retrieved from an online weather database.

4. The method according to claim 1, wherein the estimating of the features of the obstructions is further based on a signal quality degradation level of the at least one sensor.

5. The method according to claim 1, wherein the one or more cleaning plans are further based on weather forecast data retrieved from an online weather database.

6. The method according to claim 1, wherein the user interface comprises a vehicle-based user interface and/or a user device-based user interface.

7. The method according to claim 1, wherein the cleaning system comprises heating wires and hot air defroster bars.

8. The method according to claim 1, further comprising:
    determining, by the processing circuitry, whether a cleaning program is needed; and
    alerting, via the user interface, the user to initiate the cleaning program, when the cleaning program is determined to be needed.

9. The method according to claim 1, further comprising:
    receiving, via the user interface, a user command from the user to initiate a cleaning program.

10. An autonomous vehicle, comprising:
    at least one sensor performing normal operation when a field of view of the at least one sensor is clear;
    a user interface;
    a cleaning system for the at least one sensor; and
    a processing circuitry configured to:
    retrieve real-time weather data of an environment outside of the autonomous vehicle;
    estimate, based on the real-time weather data, features of obstructions;
    propose, based on the features of the obstructions, one or more cleaning plans to a user, such that the one or more cleaning plans are displayed on the user interface; and
    execute, a selected cleaning plan that is selected by the user from the one or more cleaning plans,
    wherein the at least one sensor is configured to detect obstructions that block a field of view of the at least one sensor,
    wherein the user interface is configured to receive the user selection of the selected cleaning plan from the one or more cleaning plans or, in response to the user not selecting from the one or more cleaning plans, a user suggestion for modifying the one or more cleaning plans in response to a query by the processing circuitry,
    wherein the processing circuitry is further configured to adjust the one or more cleaning plans based on the user suggestion, and
    wherein the cleaning system is configured to clean the at least one sensor to remove the obstructions according to one of the selected cleaning plan and the adjusted one or more cleaning plans.

11. The autonomous vehicle according to claim 10, wherein the processing circuitry is further configured to determine that operation of the sensor is abnormal when a signal quality of the sensor is below a pre-determined threshold, and
    wherein the processing circuitry is configured to execute the selected cleaning plan when the operation of the at least one sensor is determined to be abnormal.

12. The autonomous vehicle according to claim 10, wherein the real-tune weather includes data read from a temperature sensor of the autonomous vehicle and/or real-time weather data retrieved from an online weather database.

13. The autonomous vehicle according to claim 10, wherein the cleaning system includes heating wires and hot air defroster bars.

14. The autonomous vehicle according to claim 10, wherein the processing circuitry is further configured to determine whether a cleaning program is needed.

15. The autonomous vehicle according to claim 14, wherein the user interface is further configured to alert the user when the processing circuitry determines the cleaning program is needed.

16. The autonomous vehicle according to claim 10, wherein the user interface is further configured to receive a user command to initiate a cleaning program.

17. A non-transitory computer readable medium storing computer-readable instructions therein which, when executed by a computer, cause the computer to perform a method for cleaning obstructions of at least one sensor of an autonomous vehicle:
  detecting, via a sensor, obstructions that block a field of view of the at least one sensor:
  retrieving real-time weather data of an environment outside of the autonomous vehicle;
  estimating based on the real-time weather data, features of the obstructions of the at least one sensor;
  proposing, based on the features of the obstructions, one or more cleaning plans to a user, such that the one more cleaning plans are relayed on a user interface;
  querying, via the user interface, a selection by the user of a selected cleaning plan regarding the one or more cleaning plans;
  in response to the user selecting one of the one or more cleaning plans that are queried via the user interface, executing, by the processing circuitry and via a cleaning system for the at least ne sensor of the autonomous vehicle, the selected cleaning plan selected by the user;
  in response to the user not selecting one of the one or more cleaning plans that are queried via the user interface, soliciting via the user interface a user suggestion for another cleaning plan, adjusting, by the processing circuitry, the one or more cleaning plans based on the user suggestion, and executing, via the cleaning system for the at least one sensor of the autonomous vehicle, the another cleaning plan suggested by the user.

\* \* \* \* \*